United States Patent
Shaikh et al.

[11] Patent Number: 5,872,714
[45] Date of Patent: Feb. 16, 1999

[54] RAPIDLY MAKING A CONTOURED PART

[75] Inventors: Furqan Zafar Shaikh, Sterling Heights; Gregory Hugh Smith, Ann Arbor; Michael Raymond Rigley, Westland; Craig Edward Burch, Southfield; Martin Andrew Brogley, Allen Park; Robert Francis Novak, Farmington Hills; Robert Walter Grenkowitz, Romeo; Gerald A. Grab, Trenton, all of Mich.

[73] Assignee: Ford Global Technologies, Inc., Dearborn, Mich.

[21] Appl. No.: 158,054

[22] Filed: Nov. 26, 1993

[51] Int. Cl.[6] .............................. G06F 17/00; G06F 19/00
[52] U.S. Cl. .............. 364/468.04; 364/191; 364/468.24; 364/468.25; 364/472.01; 364/474.24; 364/474.29
[58] Field of Search ............................. 364/191, 474.03, 364/474.24, 474.29, 468.03, 468.04, 468.24, 468.25, 472.01, 472.02; 395/120

[56] References Cited

U.S. PATENT DOCUMENTS

| | | | |
|---|---|---|---|
| 4,675,825 | 6/1987 | DeMenthon | 364/474.12 |
| 4,736,306 | 4/1988 | Christensen et al. | 364/191 |
| 4,979,224 | 12/1990 | Maiocco et al. | 382/8 |
| 5,031,483 | 7/1991 | Weaver | 76/107.1 |
| 5,177,689 | 1/1993 | Kinasi et al. | 364/474.26 |
| 5,249,135 | 9/1993 | Fujita | 364/474.21 |
| 5,351,196 | 9/1994 | Sowar et al. | 364/474.24 |

FOREIGN PATENT DOCUMENTS

A-4124961 1/1993 Germany.

Primary Examiner—Paul P. Gordon
Attorney, Agent, or Firm—Joseph W. Malleck

[57] ABSTRACT

Method of rapidly producing a contoured part, comprising: designing a computer graphic model of the part, sectioning the graphic model into graphic members which are at least one of blocks or slabs, carving a solid member (14–150 mm in thickness) for each of the graphic members, the solid member being proportion to and enveloping such graphic members, the carving being carried out by accessing two or more sides (opposite sides) of such solid member to at least essentially duplicate the corresponding graphic member, and securing the carved solid members together to replicate the graphic model as a usable unitary part.

The method can be modified to make castings by carving wax or foam solid members which are assembled to form an investment pattern, the was pattern being used in a shell mold casting steps and the foam pattern being used in evaporative casting steps.

7 Claims, 11 Drawing Sheets

COMBINATION OF SLICES

RAPIDLY MAKING A CONTOURED PART

BACKGROUND OF THE INVENTION

1. Technical Field

This invention relates generally to manufacturing and shaping of parts constituted of reasonably rigid material, and more particularly to rapid prototyping of such parts by sectioned object machining which facilitates free-form fabrication.

2. Discussion of the Prior Art

It is becoming paramount that prototype parts and their associated tools be fabricated faster in free-form, at lower cost, particularly in metal shapes, have superior surface finish and require little or no remachining. Technology attempting to meet these objectives fall into generally four categories: extruding, spraying, curing and laminate forming. Each has significant disadvantages that fail to meet all of the objectives.

Extrusion uses a heated nozzle to extrude hot wax or other polymer filaments, such as nylon, into a shape. It cannot be used to make metal parts; it is fragile, subject to delamination, and is expensive.

Spraying can be either (i) an emulsion type where a binder is sprayed onto a metal powder which is subsequently laser sintered, or (ii) thermally sprayed at high temperature using a metal powder to produce a shape. Spraying is expensive, slow and produces a mediocre surface finish which is porous.

Curing, often times referred to as stereolithography, involves subjecting photo-sensitive polymer resins in thin layers to a laser beam for curing and thence repeating these steps to build up a part. It is generally slow, useful only for nonmetals and tooling, and requires expensive emission control measures because of the odorous materials. It also demands post machining because the surface is not stable during storage, is somewhat brittle, and is size limited.

Prior art laminate forming involves cutting of metal plys, paper, plastic sheets or foam, by use of a laser beam, hot wire or mechanical cutter to make sheet-like cutouts; the cutouts are subsequently assembled to form a unit. Laminate forming first was carried out without a computer graphic guide, the cutter following a mechanical guide. More recently, the prior art has programmed the cutter to follow a computer model or graphic such as shown in U.S. Pat. No. 4,675,825 patented on Jun. 23, 1987 to DeMenthan. The latter type of laminate forming has been used to shape metal, but fails to eliminate post-machining of the unit, lacks high structural integrity because of the need to use very thin laminates, is incapable of making complex parts such as intricate engine cylinder heads, manifolds or engine blocks, and is slow due to the high number of handling and finishing operations resulting from the number of laminates.

The requirement of post-machining for state of the art laminate forming is a significant drawback. Machining used for this process works only to cut edges of the thin sheet metal (up to 12 mm) inhibiting full contour machining. When the sheets are assembled, the total surface will be somewhat ragged or stepped, requiring post-machining to obtain acceptable surface finishing. If the laminates are foam, paper or plastic, the same problem remains because of the inability to fully free-form the edges of the material; moreover, foam materials can produce a high degree of porosity in the final surface when assembled.

SUMMARY OF THE INVENTION

It is an object of this invention to rapidly make a contoured part by a more economical sectioned-object machining technique adaptable to the most complex parts, the method resulting in an immediate assembled surface finish that is superior, and the method having little or no disadvantageous manufacturing side effects.

The invention, meeting such object, is in a first aspect a method that comprises: (a) designing a computer graphic model of the part; (b) sectioning the graphic model into graphic members which are at least one of blocks or slabs; (c) carving a solid member for each graphic member that is proportional to and envelopes such graphic member, said carving being carried out by accessing two or more sides of such solid member to at least essentially duplicate the corresponding graphic member; and (d) securing the carved solid members together to replicate the graphic model as a usable unitary part.

Carving is carried out on opposite sides of each member, such as by CNC milling machines, the thickness of the solid members being in the range of 14–150 mm and each of the solid members having opposed sides which are parallel or skewed with respect to each other.

The method is capable of being applied to the making of unique machined metal functional parts, to the making of rapid developmental prototypes of cast metal parts, and to the rapid making of initial or preproduction cast components.

DETAILED DESCRIPTION AND BEST MODE

The method of this invention machines a plurality of stratiform members which together, when assembled, constitute a desired part. The stratiform members are relatively thick sections of the part, herein called slabs or blocks, which demand as well as facilitate two-side machining (preferably opposite sides) controlled by computerized three axis milling machines. The fabrication time for the part will be significantly reduced and the method will be particularly effective when making a complex, multi-cored cast part such as an engine cylinder head or engine block.

Figure 1:
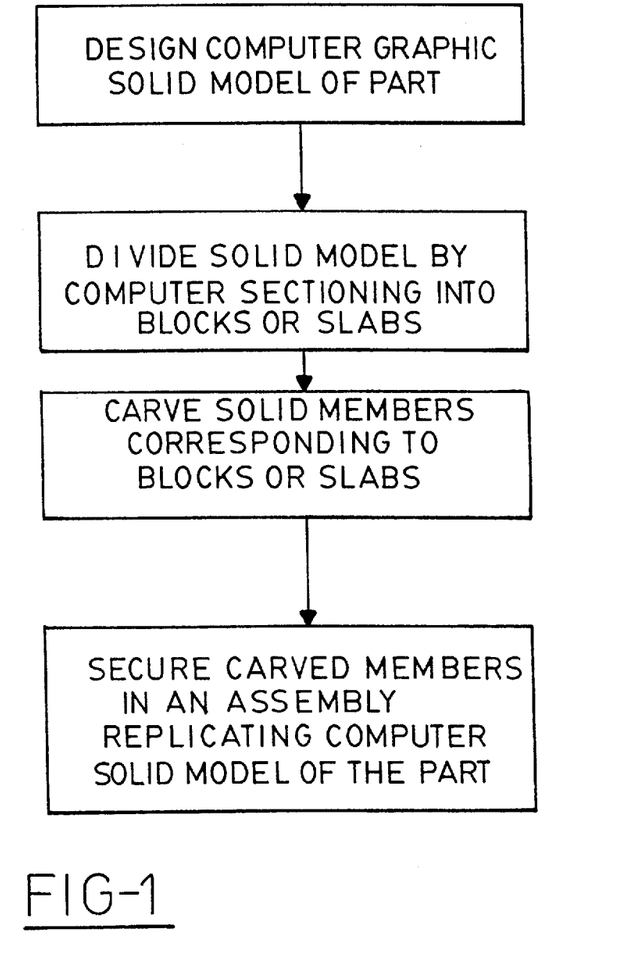
FIG. 1 is a block diagram of a process embodying the principles of this invention.

As shown in FIG. 1, the method comprises four basic steps, the first three of which are carried out within or under the control of a programmed computer. The design of the computer graphic/model should be a three dimensional CAD (computer aided design) solid model or fully surfaced model such as the single cylinder engine head shown in FIG. 2. Constraints must be given to the computer to control the design in certain parameters, such as solid stock size to be machined, direction of machine tool access, and the finish desired on the completed part. The design may also involve the placement of assembly or securing bolt openings which do not interrupt the internal functional cavities as shown in FIG. 2A. In this graphic, the head 10 has a central combustion chamber roof 11, intake passages 14, 15, and exhaust passages 12, 13, along with a plurality of valve seats 16 for each of the passages. Several bosses are defined including spark plug or fuel injector boss 17, valve guide bosses 18 and joining bosses 19.

Figure 3A:
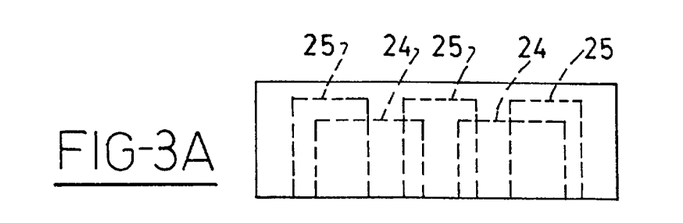
FIG. 3A is a schematic plan for taking sections or slices of the graphic model.
Figure 3B:
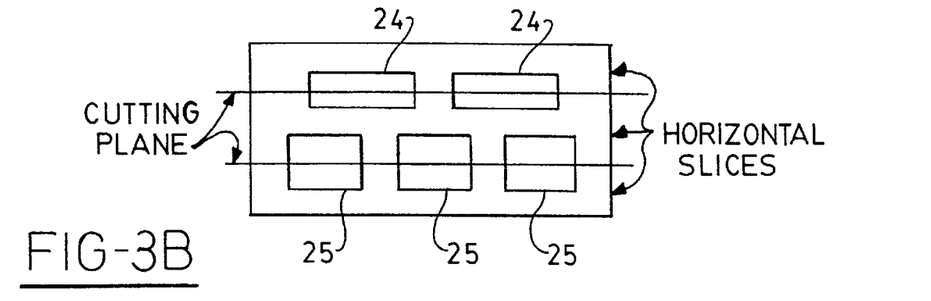
FIG. 3B is an elevational view of FIG. 3A.

It is important to plan the sectioning of the graphic model according to the block or slab concept of this invention, taking into account the location, size and shape of the internal cavities of the part to be produced. For example, as shown in FIGS. 3A and 3B, if the internal cavities 24, 25 are located in vertically spaced rows and if the cavities 24, 25 widely overlap in plan view, horizontal sectioning through each row of cavities is desirable to expose all of the cavities to proper access by the milling cutter. Such sectioning may be constrained by the minimal thickness that can be used to achieve a stable block or slab according to this invention. Such stable minimum thickness is about 14 mm for metals such as aluminum and steel. Such minimum thickness may be adjusted based upon the strength of an alternative material. Such minimum thickness and strength is necessitated by the need for full three axis contour machining, not merely vertical cutting as with sheet metal.

Figure 4A:
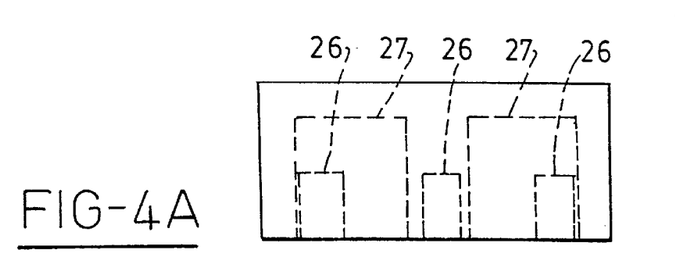
FIG. 4A is schematic elevational view of a plan for taking a combination of both vertical and horizontal slices or sections of the computer model.
Figure 4B:
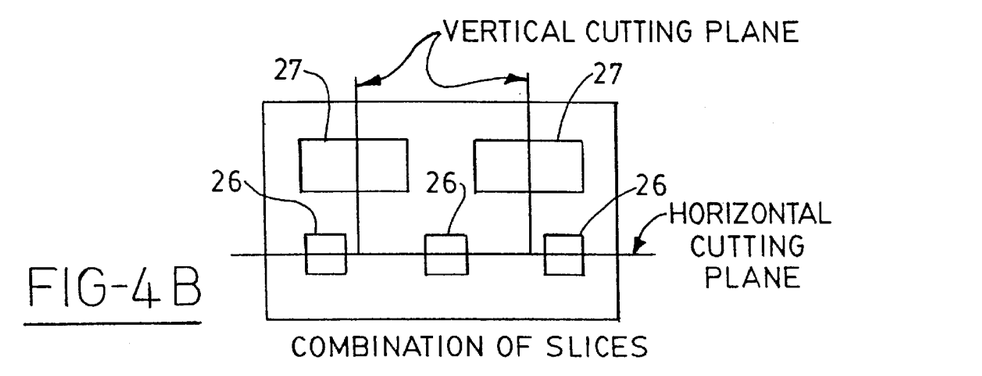
FIG. 4B is a side view of the plan shown in FIG. 4A.
Figure 5:
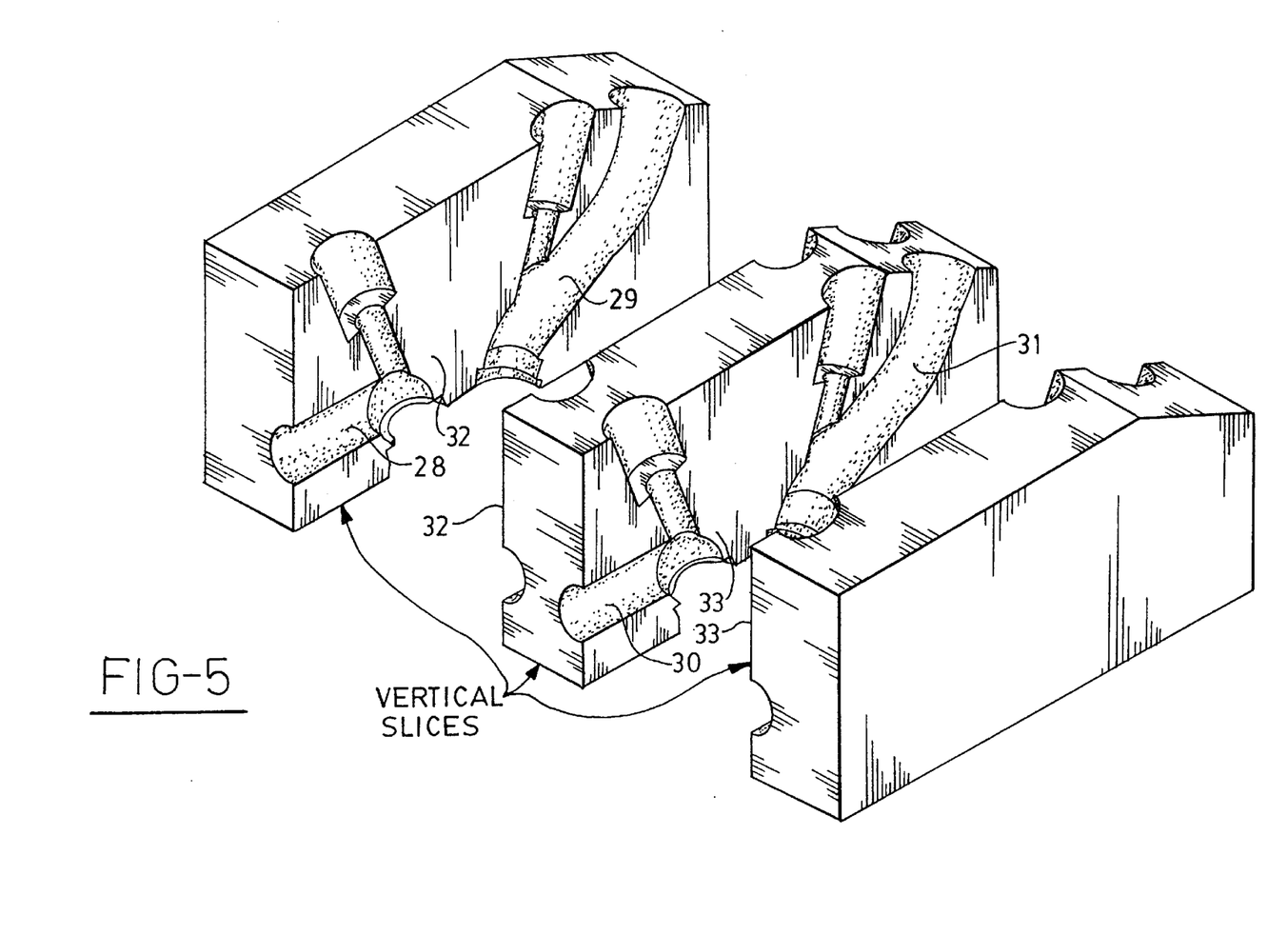
FIG. 5 is an exploded perspective view of selected computer sections of the model of FIG. 2, the sections being selected to facilitate opposite side machining.

It may be practicable, in certain cases, to combine both horizontal and vertical sectioning planes, such as shown in FIGS. 4A and 4B, where the lower series of cavities 26 are enveloped within the plan view of the upper cavities 27. Still another alternative is to utilize only vertical sectioning such as shown in FIG. 5. Such sectioning may also create steps in the slabs or blocks. The ability to expose properly the internal passages 28, 29, 30 and 31 is a criteria by which this sectioning should be selected. Here, such passages are generally in vertical planes 32 and 33.

Figure 2:
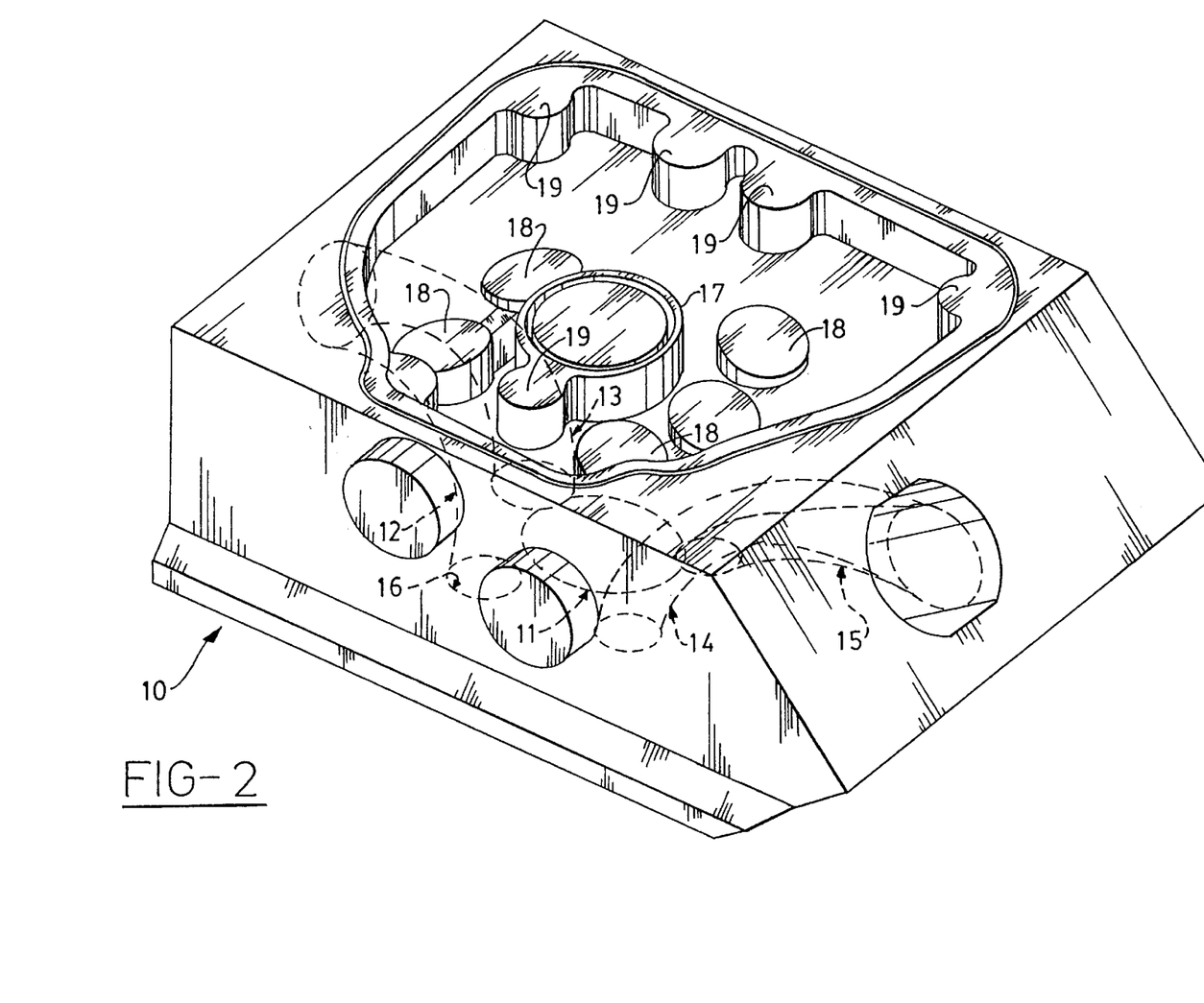
FIG. 2 is a perspective view of a computer graphic model of an engine head design having a single cylinder.
Figure 2A:
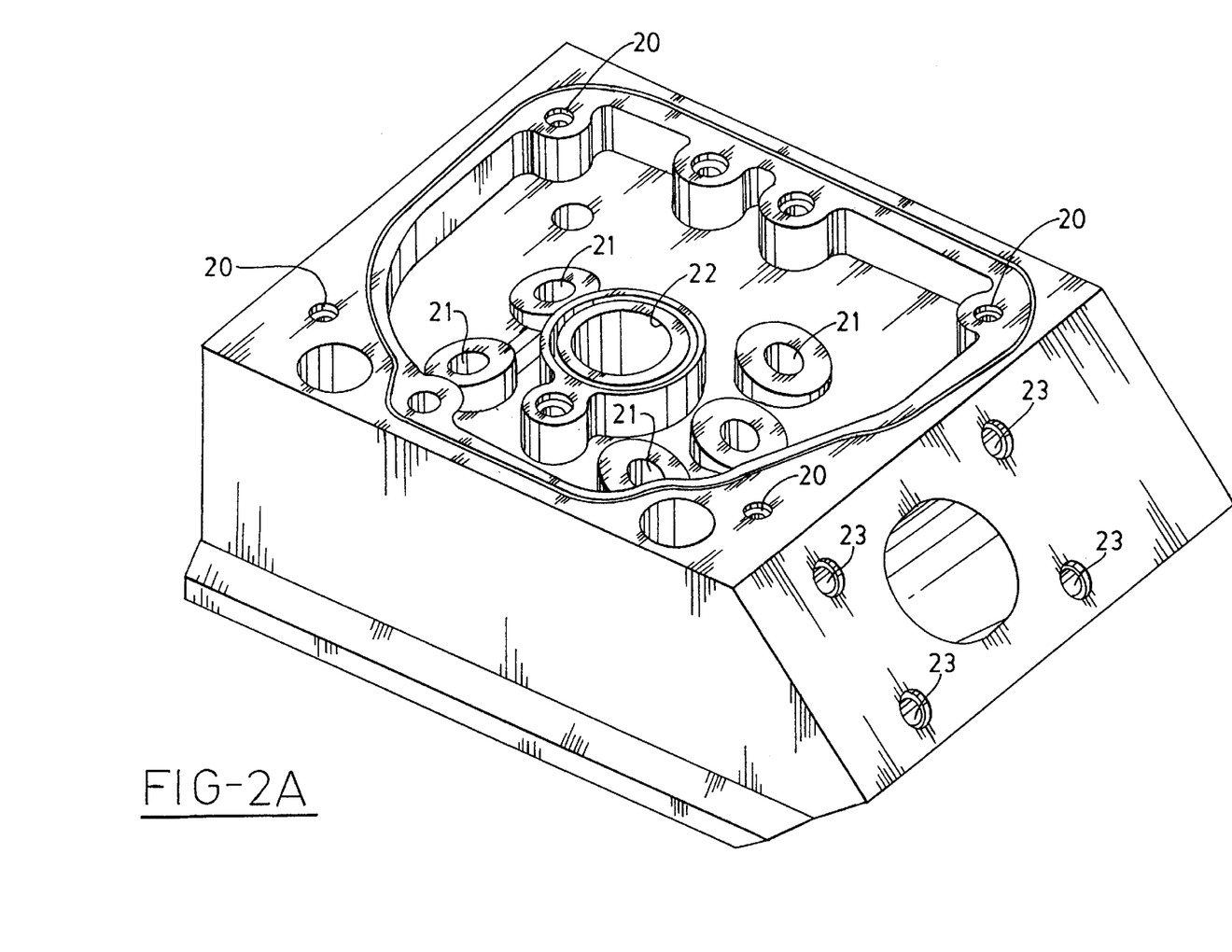
FIG. 2A is a view like 2, but showing additional design work such as bosses, locating holes, or bolt holes.
Figure 6:
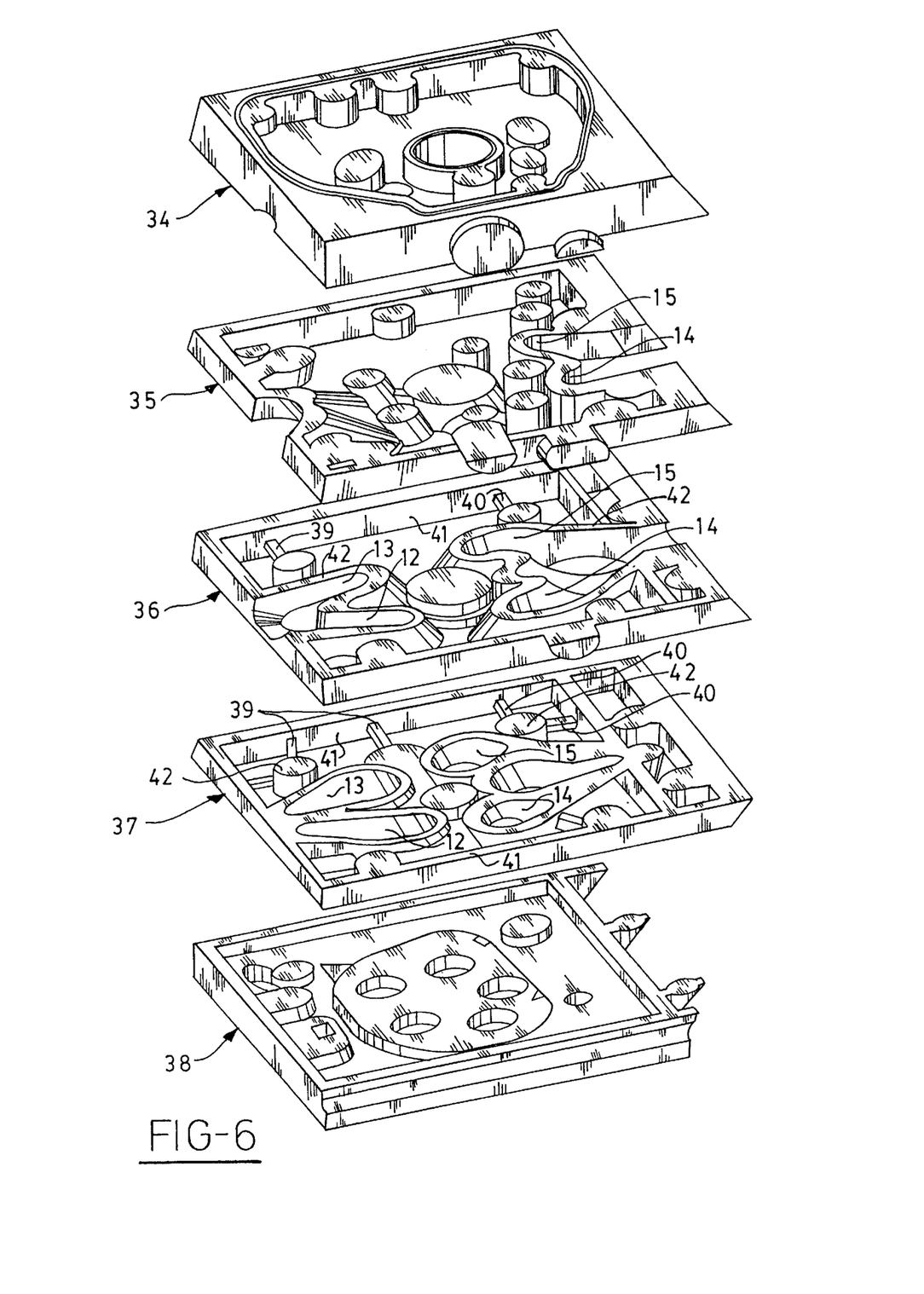
FIG. 6 is an exploded perspective view of computer sections that create slabs of the design shown in FIGS. 2A and 2B.

As shown in FIG. 6, five sections or slices of different but uniform thicknesses were determined to optimally expose the interior cavities of the single cylinder engine head model of FIG. 2. The slabs are graphic members 34, 35, 36, 37 and 38. Note the narrow thickness of slab 37, the greater thickness of slabs 35 and 36, and the still greater thickness of slabs 34 and 38. All of the slabs are of generally uniform thickness as a result of parallel horizontal sectioning. The complex contours and unusual shape of the exhaust passages 12, 13 and intake passages 14, 15 are exposed for three axis machining by the slabs 35–38, leaving no uncuttable areas or overhangs. The lack of complex contours in the top and bottom slabs 34, 38 allow such slabs to have greater thickness.

The sectioning of the computer graphic model is adapted to provide for overlap between the slabs or graphic members. Such overlapping aspect is necessary to maintain continuity between surfaces. In certain slabs or graphic members, the bosses defining certain cavities may be suspended and detached from the side walls 41 within that particular slab, thus necessitating the use of bridges 39, 40 such as shown for slabs 36 and 37; such bridges may be later removed if necessary or desired.

The surface quality of the machined solid members (slabs or blocks) is dependent on the surface requirements, preferably about 0.005 mm when utilizing material such as aluminum or steel. However, the surface finish can be adapted to the material being cut so that it is better than that normally provided by present industrial standards. The solid members (blocks or slabs) to be machined should have a size which is generally equal to or greater than the corresponding graphic member to thereby envelope all sides of the computer graphic member.

Figure 7:
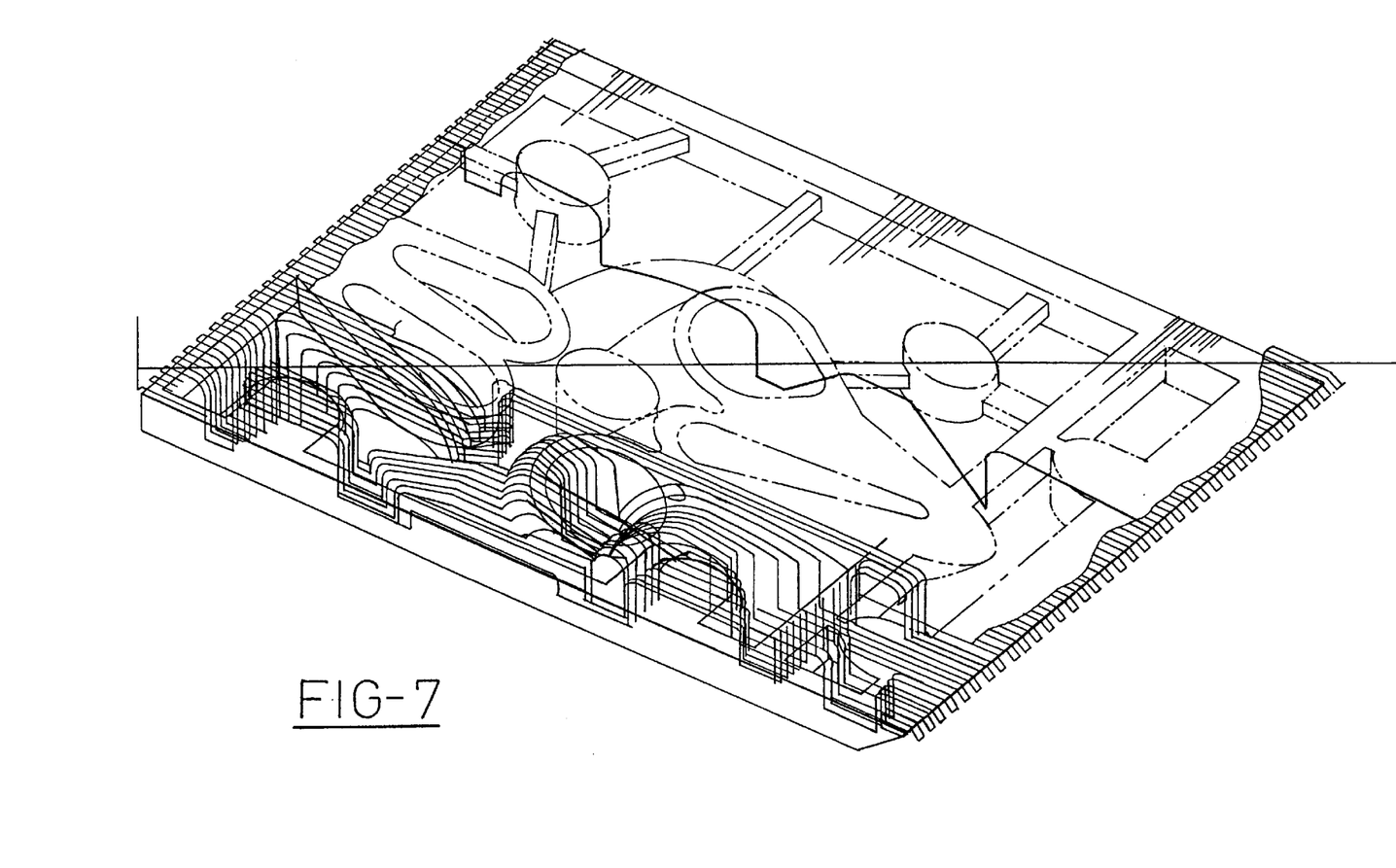
FIG. 7 is a perspective view of the computerized cutting path which has been determined to carry out cutting of the top side of the fourth graphic member (37) in FIG. 6 and thereby the fourth solid member.
Figure 8:
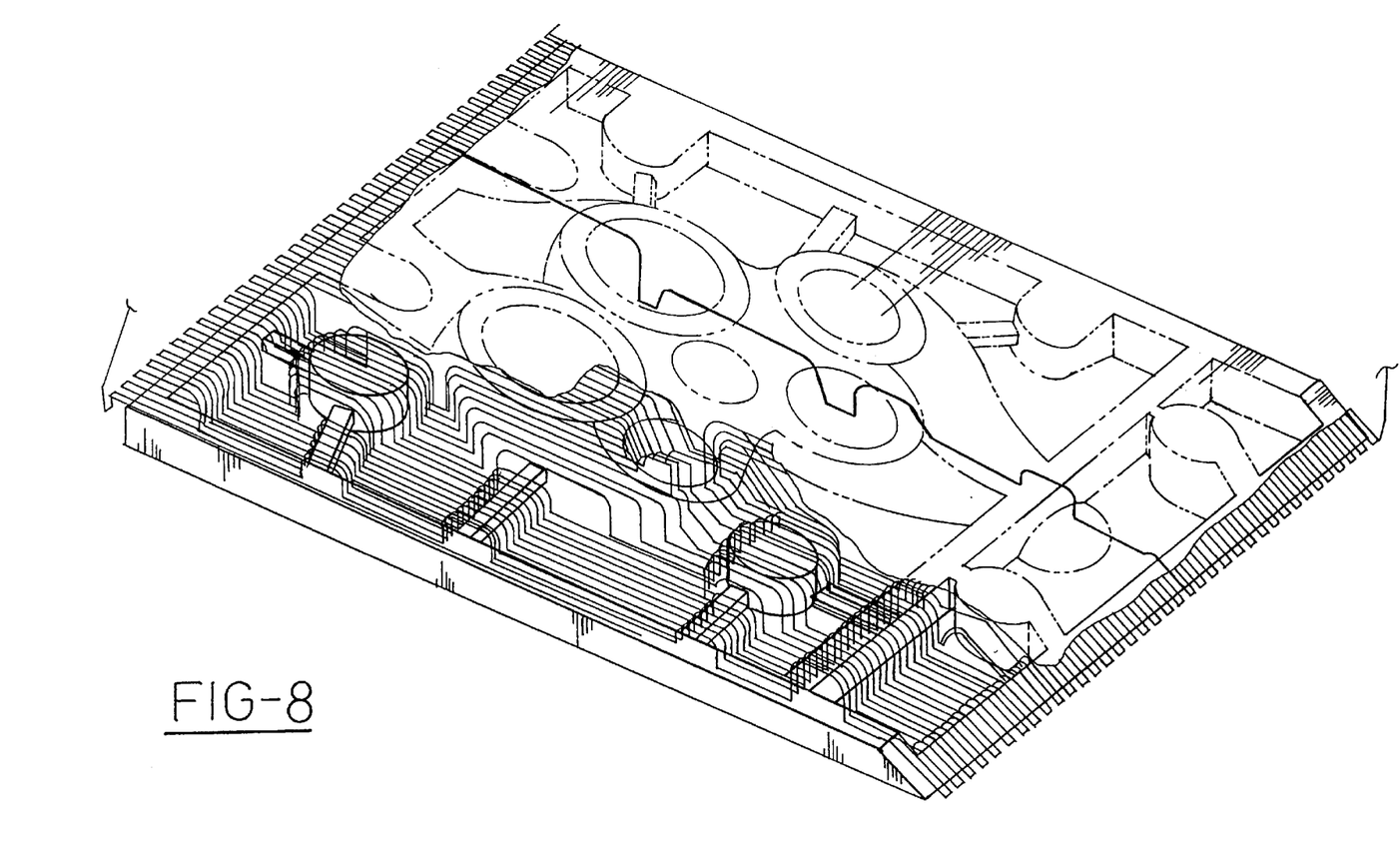
FIG. 8 is a perspective view like that in FIG. 7, but for a cutting path for the bottom of the fourth graphic member (37) and thereby the fourth solid member.

Once the solid model has been sectioned into blocks or slabs, tool cutting paths must be derived by the computer program for the plurality of the exposed surfaces that are to be machined in each solid member (block or slab), preferably at the opposed top and bottom surfaces of horizontal sectioned solid members. Tool paths 44, 45 for the single cylinder engine head are shown in FIGS. 7 and 8 for member 37. Tool path 44 is for top access to the member shown in FIG. 7, and tool path 45 is for bottom access (the member turned over) to the member shown in FIG. 8. The software that is utilized to derive such tool paths is generally known as Computer Visions®-CAD/CAM system, and consists of solid modeling, numerical control, and drafting. The tool paths, once generated, within the computer, are verified by Vericut® software.

Figure 9:
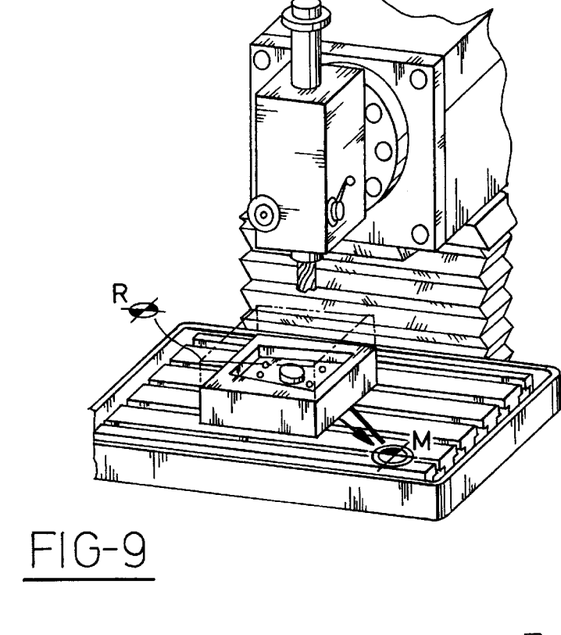
FIG. 9 is a perspective schematic view of a typical three-axis milling machine cutter as applied to the cutting of the top side of a solid member.

In carrying out the third step of the basic process, CNC milling is utilized to carve the various internal cavities and surfaces of each solid member (slab or block) while the solid member is rigidly fixed to the milling machine. It is desirable to drill locating openings for locator pins or alignment pins to facilitate holding or fixturing the solid member during subsequent machining, as shown in FIG. 9. The locator openings and joining openings will also determine the exact reassembly of the solid members (slabs and blocks) as a unit. The bolt holes (that may be utilized to secure the assembly in some cases) should be drilled with precise accuracy. It is important that the milling machine be able to remove material in the X, Y and Z axes to create a duplicate of the graphic model. An example of a CNC milling machine that may be utilized for purposes of carrying out this step of the process is shown in FIG. 9. Although only three axis milling is needed, the method can utilize four or five axis milling also, but it may not be necessary.

Figure 10:
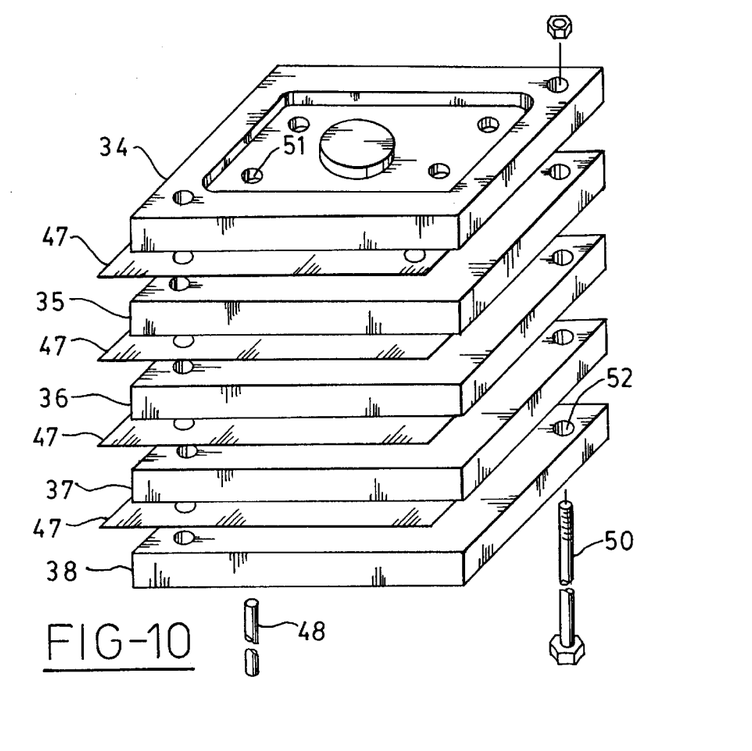
FIG. 10 is an exploded view of the solid members after machining, and as assembled together with brazing sheets therebetween.

In the final step of the basic process, the individual slabs or blocks should be preferably cleaned to remove all oxides in the event that securing is by brazing, soldering, or adhesive requiring some form of substance action. In the example of the single cylinder engine head, the slabs are assembled together after cleaning with brazing foil or sheets 47 superimposed between members 34–38 as shown in FIG. 10; locating pins 48 are introduced to aligning openings 51 to precisely bring the solid members (slabs) together in the exact location needed to duplicate the graphic model.

Additionally, bolts or fasteners 50 may be employed through openings 52 to clamp the assembly together during handling within a furnace used for heat treatment to follow. The brazing material utilized for aluminum alloys is a eutectic aluminum Si-Mg braze foil, having the following chemistry: 83–90% Al, 9–13% Si, 0.1–1.75% Mg, 0–0.15% Bi. The sheets of brazing material have a thickness in the range of 0.003–0.010 inches. If other materials such as cast iron, alloy steels, or Mg alloys are used, a different suitable eutectic brazing or soldering material is used.

After cleaning the assembly, the clamped unit is placed in a furnace in a suitable inert atmosphere with or without flux, and subjected to a precise heating cycle to complete brazing and effect a metallurgical bond between the brazing material and the slabs themselves. The unit is heated to a temperature that is roughly 30° C. below the melting temperature of the solid members (slab metal) (about 595° C. for aluminum). A subsequent cooling/heating cycle within the furnace may be used such as a T5 or T6 cycle.

The method of this invention reduces the overall time period for producing a metal part by as much as 30%, reduces cost by typically 50%, and eliminates side effects such as distortion, instability of the assembled unit, brittleness, odorous emissions, limitations as to member material selection, and the need for rotating the solid member while machining. With respect to time reductions, it is now conventional to make metal prototypes by sequence which involves machining patterns, making a mold, and then casting parts. This will typically take 15 weeks. In contrast, the single cylinder head disclosed in the above description can be designed and produced within 3–4 weeks. The process eliminates waste, reduces the number of steps and personnel needed to perform, and permits use of a variety of materials such as cast iron, magnesium, steel, aluminum, and alloys thereof; all lead to cost reduction.

The resulting product of this method comprises: a stack of solid members (blocks or slabs) secured together in sequence to replicate the three-dimensional computer graphic model of the part, the solid members (blocks or slabs) being prepared by the steps of (i) sectioning a graphic model into graphic members which are blocks and/or slabs, and (ii) carving a solid member (block or slab) for each of the graphic model members by accessing two or more sides of the solid members to essentially duplicate the corresponding graphic section members. Such product will possess valuable unique characteristics which comprise structural stability, an outer contoured smooth surface that is not interrupted or stepped from solid member to solid member (block to block or slab to slab), the surface finish and strength of the product being at least as good as that conventionally produced. For the solid members utilized in the basic method, metal is selected as normally required by the functional part. The sectioning must accommodate the condition of the solid member when reduced to stratiforms, while providing access to the designed internal cavities. The product eliminates stack-up errors characteristic of object sectioning using very thin laminations.

Figure 11:
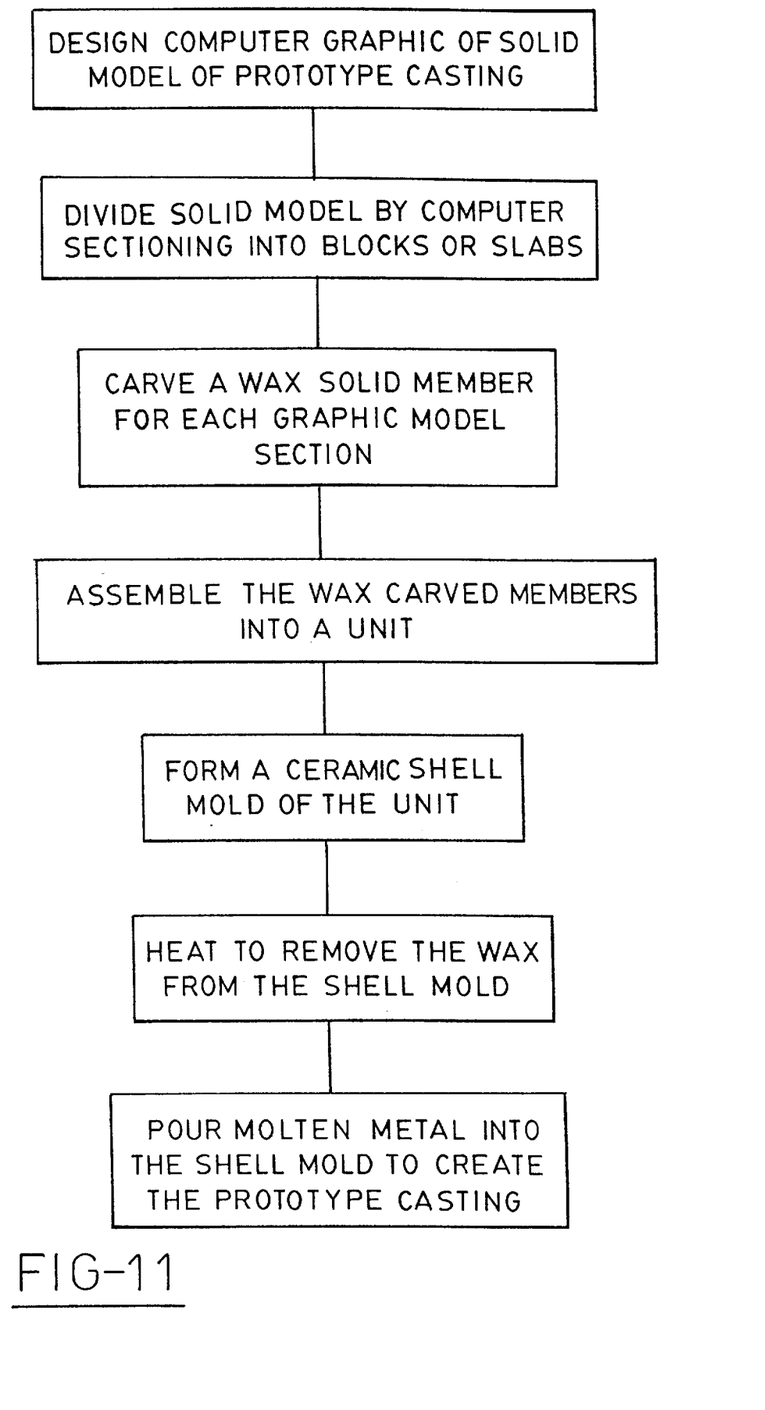
FIG. 11 is a schematic flow diagram depicting how the method of this invention can be applied to the fast prototyping of cast components.

As shown in FIG. 11, the process can be first modified to rapidly produce cast (metal or synthetic) parts in prototype quantities at greatly reduced cost and time. Thus, the basic method would be used to create a nonfunctional part or tooling which then in turn is used to produce a cast part. The alternative method requires modifying step 3 by using wax (instead of metal) for the solid members to be carved. The solid members are carved, assembled into a unit to define an investment pattern. The pattern is coated with a ceramic shell to create a mold. The wax investment pattern is dipped and coated with ceramic slurry to form a surrounding shell which can function as a mold. The mold is preferably formed by dipping the pattern into a slurry consisting of a ceramic flour in colloidal silica and then sprinkling it with a fine sand. After drying, the mold is dipped into another ceramic slurry, then into a fluidized bed containing granular molochite thus stuccoing the surface again. The wax is removed by heat leaving the desired casting cavity, which is then filled with molten metal to form the prototype cast object precisely duplicating the computer graphic model.

The investment wax pattern may be removed either by shock-firing or steam autoclaving. When metal is poured into the mold cavity to produce the required cast object, a precise and accurate casting is produced. Such method of producing castings provides superior and accurate surface quality when compared to other rapid prototyping techniques. The tool paths developed are closer to the production tool level and the sectioning of the computer model for a wax pattern can follow true parting lines needed for casting purposes. The process allows reduced fabrication time, thus giving greater lead time in designing new parts for automobiles and thereby earlier evaluation of competing designs.

Figure 12:
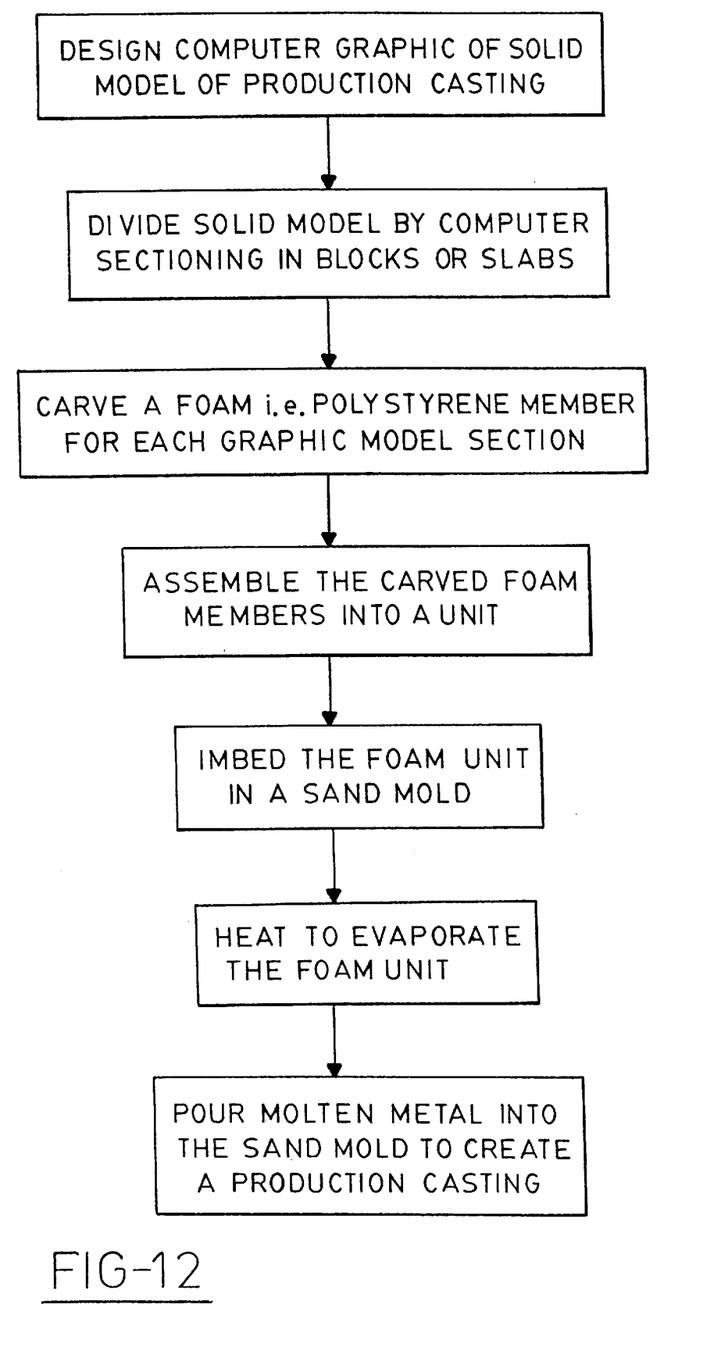
FIG. 12 is a schematic flow diagram of how the method of this invention can be applied to the rapid making of initial preproduction cast components.

As a still further modification of the basic process, rapid production castings can be economically produced, for example, in quantities of 100 or less. As shown in FIG. 12, such method involves carving of foam patterns, (comprised of polystyrene) by CNC milling machines which are guided by the computer graphic model. Such computer model foam pattern is again sectioned into members (blocks and slabs) for carrying out the machining of the internal cavities of the part. The foam solid members, after carving (machining) are assembled together in a unit and secured such as by microwave adhesion or by introducing a fluid adhesive to the mating surfaces of the solid members. The assembled foam pattern is then given a refractory coating and dried. The unitized foam members are inserted into an open chamber into which fluidized dry sand is introduced to surround and fill the foam pattern; the pattern assembly must also contain suitable foam gating members such as from stock foam parts. Molten metal is poured into the gating members of the foam pattern to displace and vaporize the foam, allowing gaseous emissions to migrate into the unbonded dry but compacted sand mold. The resulting casting will contain a precise definition of the computer designed production casting. This method modification is particularly valuable to produce limited preproduction castings.

We claim:

1. A method of rapidly producing a contoured part comprising:
    (a) designing a computer graphic model of said part;
    (b) sectioning said graphic model into graphic members by graphic parallel planes to create graphic slabs;
    (c) carving a metallic solid member for each of the graphic members, said solid member being generally uniform in thickness, proportional to and enveloping such graphic member, and the metal being selected from the group of aluminum, steel, cast iron, magnesium and alloys thereof, the thickness of each solid member being in the range of 14–150 millimeters, said carving being carried out by accessing two or more sides of such solid member to at least essentially duplicate the corresponding graphic member; and
    (d) securing said carved members together to replicate said graphic model as a unitary part.

2. A method of making a contoured functional part comprising:

(a) designing a computer graphic model of said part;

(b) sectioning said graphic model into a plurality of overlapping stratiforms, each stratiform having a thickness that exceeds 14 millimeters;

(c) developing a computer program for a three or more axis cutting machine to cut a plurality of individual solid member corresponding to the contours of said plurality of stratiforms;

(d) providing individual solid members, each having a thickness that envelopes one of the corresponding stratiforms;

(e) providing a three or more axis cutting machine;

(f) securing each solid member in a precise location and cutting such member with said cutting machine by use of cutting access to at least two sides of said member;

(g) assembling said cut solid members into a stack in a preselected sequence corresponding to said graphic models; and (h) securing said assembled solid members into a integral unit to constitute said part.

3. The method as in claim 2, in which said solid members are comprised of a material selected from the group consisting of aluminum, magnesium, cast iron, steel, and alloys thereof.

4. The method as in claim 2, in which said securing in step (f) is by brazing utilizing high density magnesium brazing material.

5. The method as in claim 2, in which at least some of said stratiforms have nonparallel upper and lower sides.

6. The method as in claim 2, in which the solid members are secured together in step (h) by brazing wherein sheets of brazing foil are inserted between the members prior to assembly and then, after assembly, subjected to a heat treatment which comprises heating to a temperature of about 595° C. in a furnace and subsequently cooling.

7. A rapidly produced contoured functional part comprising:

(a) a stack of blocks secured together in sequence to replicate in physical three-dimension computer graphic model of the part, said blocks being prepared by the steps of (i) sectioning the graphic model into graphic members which are at least one of blocks and slabs, and (ii) carving the solid members proportional to and enveloping a respective graphic member by accessing two or more sides of the solid member to at least essentially duplicate the corresponding graphic member;

(b) said stack of blocks having a structural stability, an outer contoured smooth surface extending from block to block which is devoid of steps or raggedness, a surface finish smooth to at least 0.01 mm.

* * * * *